(12) United States Patent
Noriega et al.

(10) Patent No.: US 6,805,289 B2
(45) Date of Patent: Oct. 19, 2004

(54) PREPAID CARD PAYMENT SYSTEM AND METHOD FOR ELECTRONIC COMMERCE

(76) Inventors: Eduardo Noriega, Av. Republica de Panama 3420, Lima 27 (PE); Jose Almenara, Av. Republica de Panama 3420, Lima 27 (PE)

(*) Notice: Subject to any disclaimer, the term of this patent is extended or adjusted under 35 U.S.C. 154(b) by 79 days.

(21) Appl. No.: 10/153,575

(22) Filed: May 23, 2002

(65) Prior Publication Data

US 2003/0218062 A1 Nov. 27, 2003

(51) Int. Cl.[7] .................................................. G06K 5/00
(52) U.S. Cl. ..................... 235/380; 235/379; 705/44; 705/52; 705/67; 705/72
(58) Field of Search ............................... 235/380, 379; 705/67, 44, 52, 72

(56) References Cited

U.S. PATENT DOCUMENTS

| | | |
|---|---|---|
| 4,305,059 A | 12/1981 | Benton |
| 4,977,595 A | 12/1990 | Ohta et al. |
| 5,655,023 A | 8/1997 | Cordery et al. |

(List continued on next page.)

OTHER PUBLICATIONS

"Visa Adds New Product With Payroll Spin" Thursday, Aug. 2, 2001 ATM&Debit News/Thomson Financial.*
"What is ACH" Internet Article at http://www.openecho.com/ach.html.*

Primary Examiner—Daniel A. Hess
(74) Attorney, Agent, or Firm—Greenberg Traurig, P.A.; Manuel R. Valcarrel, Esq.

(57) ABSTRACT

A prepaid card system enabling access to payment-based websites comprising one or more prepaid cards bearing a stored value and authentication codes; one or more cardholder computers communicating via the Internet with merchant websites; a "middleman" server communicating via an intranet with merchants, prepaid card issuers and said merchants' banks; one or more searchable databases hosted on the middleman's server storing merchant registration information, card issuer information; one or more software applications to interpret the data sent by the middleman server for the identification and online deduction of the amount of value used in a transaction from a prepaid card; one or more software applications for reception and transmission of cardholder card data; and one or more software applications for transaction accounting and payment processing between merchants, card issuers, middleman and merchants' banks. A prepaid card payment method for electronic commerce is also disclosed and claimed.

14 Claims, 10 Drawing Sheets

U.S. PATENT DOCUMENTS

| | | | | |
|---|---|---|---|---|
| 5,696,908 A | | 12/1997 | Muehlberger et al. | |
| 5,708,780 A | | 1/1998 | Levergood et al. | |
| 5,721,768 A | | 2/1998 | Stimson et al. | |
| 5,768,385 A | | 6/1998 | Simon et al. | |
| 5,832,089 A | | 11/1998 | Kravitz et al. | |
| 5,839,119 A | | 11/1998 | Krsul et al. | |
| 5,878,140 A | | 3/1999 | Chaum | |
| 5,895,454 A | * | 4/1999 | Harrington | 705/26 |
| 5,901,229 A | | 5/1999 | Fujisaki et al. | |
| 5,920,629 A | | 7/1999 | Rosen | |
| 5,936,221 A | | 8/1999 | Corder et al. | |
| 5,943,423 A | | 8/1999 | Muftic | |
| 5,963,924 A | | 10/1999 | Williams et al. | |
| 5,983,207 A | | 11/1999 | Turk et al. | |
| 5,999,625 A | | 12/1999 | Bellare et al. | |
| 6,003,014 A | | 12/1999 | Lee et al. | |
| 6,014,646 A | | 1/2000 | Vallee et al. | |
| 6,016,484 A | | 1/2000 | Williams et al. | |
| 6,018,717 A | | 1/2000 | Lee et al. | |
| 6,029,150 A | | 2/2000 | Kravitz | |
| 6,047,067 A | | 4/2000 | Rosen | |
| 6,070,150 A | * | 5/2000 | Remington et al. | 705/34 |
| 6,105,008 A | | 8/2000 | Davis et al. | |
| 6,109,524 A | * | 8/2000 | Kanoh et al. | 235/381 |
| 6,119,946 A | | 9/2000 | Teicher | |
| 6,148,091 A | | 11/2000 | Di Maria | |
| 6,173,269 B1 | * | 1/2001 | Solokl et al. | 705/35 |
| 6,192,142 B1 | | 2/2001 | Pare, Jr. et al. | |
| 6,205,435 B1 | | 3/2001 | Biffar | |
| 6,222,925 B1 | | 4/2001 | Shiels et al. | |
| 6,223,169 B1 | | 4/2001 | Mori et al. | |
| 6,233,618 B1 | | 5/2001 | Shannon | |
| 6,236,981 B1 | | 5/2001 | Hill | |
| 6,282,522 B1 | | 8/2001 | Davis et al. | |
| 6,286,001 B1 | | 9/2001 | Walker et al. | |
| 6,292,904 B1 | | 9/2001 | Broomhall et al. | |
| 6,321,894 B1 | | 11/2001 | Johnsson | |
| 6,327,578 B1 | | 12/2001 | Linehan | |
| 6,336,133 B1 | | 1/2002 | Morris et al. | |
| 6,343,284 B1 | * | 1/2002 | Ishikawa et al. | 705/67 |
| 6,343,738 B1 | | 2/2002 | Ogilvie | |
| 6,364,208 B1 | | 4/2002 | Stanford et al. | |
| 6,366,893 B2 | | 4/2002 | Hannula et al. | |
| 6,377,994 B1 | | 4/2002 | Ault et al. | |
| 6,473,500 B1 | * | 10/2002 | Risafi et al. | 379/144.01 |
| 2002/0055911 A1 | * | 5/2002 | Guerreri | |

* cited by examiner

MERCHANT REGISTRATION WITH MIDDLEMAN
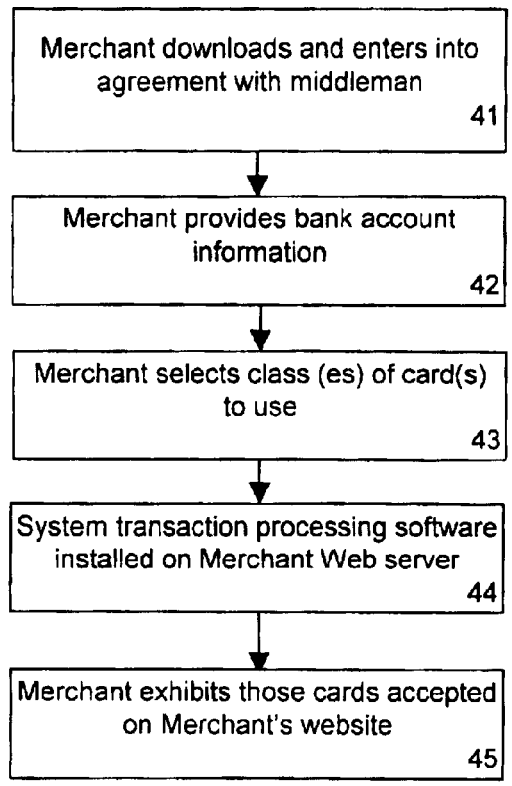
Fig. 2-A
TRANSACTION EXECUTION
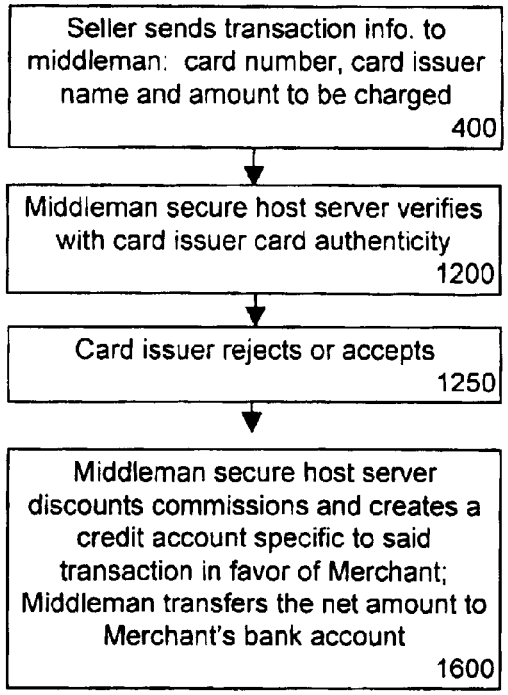
Fig. 2-B

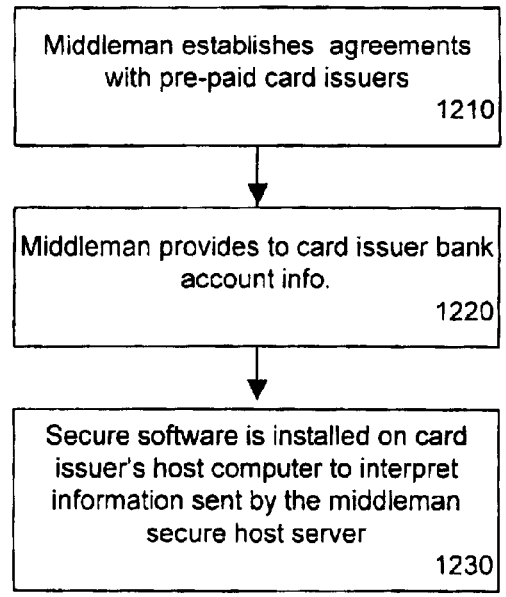
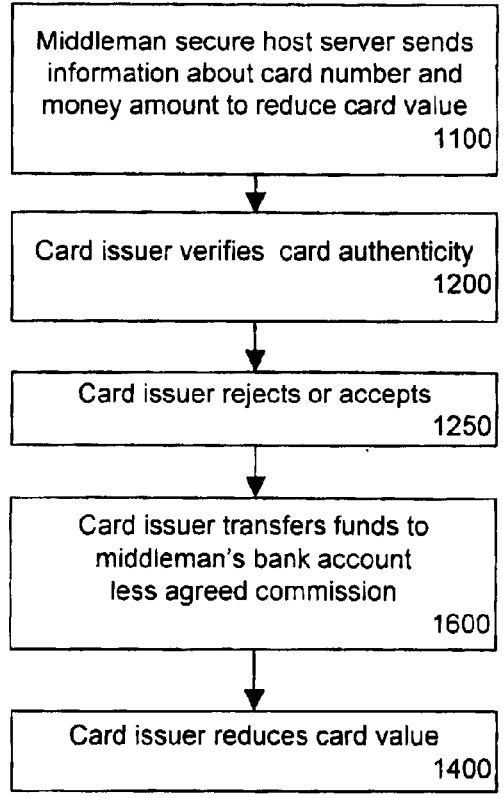
Fig. 3

Flow Chart:
Business Process

PREPAID CARD PAYMENT SYSTEM AND METHOD FOR ELECTRONIC COMMERCE

BACKGROUND OF THE INVENTION

1. Field of the Invention

The present invention relates to a streamlined system for the prepaid access to payment-based websites on the Internet and for use in payment in electronic commerce transactions. More particularly, the present invention relates to a prepaid card payment system and method enabling anonymous electronic commerce transactions, enabling e-commerce merchants, through the system's middleman, to accept as payment not only the system's proprietary prepaid cards, but also the prepaid cards of other third party card issuers that the system middleman has relationships with, and also including, in one embodiment, user age restrictions included in the prepaid cards for use in accessing payment-based adults-only websites.

2. Description of Related Art

Prepaid card services are well-known in the art. Such cards are typically purchased from vending machines or point of sale racks and displays and the like and come in fixed value increments, for example, $10, $20 and $50. A $10 card provides the customer with a certain amount of access time, such as with prepaid long distance telephone cards; the $20 card provides twice that amount, and so forth. Because the charges are limited to the card's face value, neither the customer nor anyone who obtains possession of the card can run up a large bill. These cards can be used anonymously, as purchaser information is typically not required to be provided when purchasing such cards.

Several examples of Internet payment systems already exist. Many of these systems are account-based; that is, both the customer and the merchant have accounts with the system. Thus, there is no provision for anonymity. Privacy is an important issue which is only partially addressed in some systems. Security is critical to all Internet payment systems, and the encryption techniques adopted vary widely.

While not an exhaustive list, examples of Internet payment systems include DigiCash of Amsterdam, The Netherlands, CyberCash of Reston, Va., and systems proposed by various banks and credit card companies. DigiCash provides a close analogue to real cash in the sense of providing unconditional anonymity for the user through a novel cryptographic technique known as "blind signatures." CyberCash offers both a credit card and a money payment service. Transactions using CyberCash are passed directly to a real bank.

In operation of such prior art systems, cards are typically batch-activated by the card provider in a limited number of predetermined values. A customer purchases one of these pre-activated cards by paying a fee. The card typically includes a predetermined identification code (which may be obscured by a scratch off material). To use the card, the customer accesses the service, enters the identification code (typically obtained from the back of the card), enters the desired number or address information for the desired destination to be contacted and access begins. When the designated value has been used, access is automatically terminated.

Prepaid card customers can obtain through their prepaid cards, currency for e-commerce transactions without credit and without payment of monthly bills. Prepaid cards are mainly bought by individuals who don't have easy credit access, such as students, full-time mothers, retired seniors and individuals without a bank account. The cards themselves are easy to use.

Use of a prepaid stored-value card as payment for Internet transactions provides numerous advantages. For example, a prepaid stored-value card can be used in small transactions where credit cards or checks would be unrealistic. Other advantages to the consumer include enhancing the value of a prepaid stored-value card by enabling access to both real and Internet merchant environments with a single card.

In addition, use of a prepaid stored-value card is extremely advantageous for small dollar amount transactions. Often, consumers are reluctant to use, and merchants are reluctant to accept, credit card transactions for small dollar amounts. For the consumer and the merchant dealing with many of these small transactions can be a bookkeeping headache and may not be worth the expense. A merchant may also be unlikely to accept a credit card for a small dollar amount transaction because of the service fees per transaction. By permitting the use of a prepaid stored-value card to make purchases over the Internet for small dollar amounts, a merchant may very well be able to begin charging for goods and/or services that he had been providing for free in the past. Prepaid stored-value cards also address the concern of many e-commerce purchasers regarding supplying their personal and credit card information via the Internet to websites that may have little or no security and which may not safeguard or may misuse such information.

Despite the existence of prior art systems and methods such as those identified above, many sellers offering goods or services through Internet, especially very low price articles, find it difficult to sell their products, as they can not find a simple secure and practical way of receiving the payment from their potential customers. They also typically have to establish a separate relationship with each card issuer, each with its own payment processing protocols, making the use of such systems complicated.

SUMMARY OF THE INVENTION

The present invention provides a simple, easy to use prepaid card system and method for electronic commerce and enables e-commerce merchants, through one relationship with a middleman, to accept as payment prepaid cards from multiple third party issuers.

The present invention utilizes a middleman secure host server including a computer and terminals that handle the payment transaction processing and data transmission to and from transaction participants. Also communicating with the middleman secure host server is the cardholder's computer and a merchant server. In one embodiment of the invention, the merchant server includes a web site and the merchant has contracted with the system middleman to accept prepaid stored-value card payments for goods and/or services purchased over the Internet. Thus, a consumer may use his or her prepaid stored-value card at a client terminal location in order to purchase goods and/or services from a remote merchant server. The Internet provides the routing functionality among the cardholder terminal, merchant server and middleman server.

From the cardholder's perspective, the present invention operates in a similar fashion as using a stored-value card in a real merchant environment. The transaction process is similar to the interaction between a stored-value card and a service payment terminal in a face-to-face merchant environment, but with functionality distributed across the Internet between the cardholder, the merchant server advertising the merchant's wares, the middleman server that manages the payment transaction processing for multiple e-commerce merchants and multiple third party prepaid card issuers in addition to the system's proprietary prepaid card, via a secure intranet. All of these entities may be physically remote from one another with router functionality being provided by the Internet and the intranet established between the middleman secure host server, the e-commerce merchant, the card issuer and the e-commerce merchant's bank.

In operation, when browsing merchant store fronts on the Internet and deciding to purchase goods and/or services, the cardholder selects the prepaid stored-value card payment option offered by the merchant. The cardholder then enters his or her card password or code. The cardholder's balance and purchase amount are preferably verified by the card issuer and preferably displayed, the transaction is either approved or rejected, and the amount is deducted from the value stored on the stored-value card.

In addition, once a value has been deducted from the stored-value card, the merchant has been informed, and the card issuer's server has recorded the transaction, the system's middleman transaction clearing and payment administration software applications reconcile the transaction and pay the appropriate e-commerce merchant the approved amount, less an agreed commission, directly to the e-commerce merchant's designated bank account.

The present invention provides numerous advantages to merchants who wish to sell goods and/or services over the Internet. For example, the present invention provides a payment solution for low-value transactions, enabling merchants to offer a wider range of merchandise and services online. A merchant is also provided a method to recover costs of services not previously charged for, and is provided immediate access to an existing, and rapidly growing, cardholder base. Furthermore, the present invention provides a turn-key transaction clearing and payment administration system through its software applications meaning that the merchant need not implement or become familiar with new procedures for reconciliation of transactions. Additionally, payment processing is accomplished for all system registered prepaid cards using the same software applications.

Furthermore, a merchant need only make a minimal investment in time and money to take advantage of the present invention and to accept payments over the Internet. The merchant need not engage in the development of complex software or accounting procedures. Thus, smaller merchants will especially benefit from the present invention. By establishing a business relationship with the system's middleman and incorporating the system's standard merchant transaction processing software, a merchant is ready to begin accepting the system's as well as multiple third party prepaid cards as payment for goods and/or services. Because a stored-value application is used, the middleman server and the cardholder provide the details of the transaction and a merchant is relieved from having to control and keep track of a transaction. Also, the middleman secure host server and the payment processing intranet of the present system manages and provides security for the transaction. From a merchant's point of view, the merchant knows that a consumer desires to purchase an item and that a cost has been transmitted to the consumer, thus, when the merchant receives a confirmation message, the merchant may release the item to the consumer. The merchant need not be concerned about security nor be responsible for authenticating a stored-value card nor for determining a balance on the card. Furthermore, transactions in multiple currencies can be completed through the use of the middleman.

The present invention also provides business benefits to card issuers and acquirers. Expansion of the functionality for a stored-value card increases revenue opportunities from cardholders and merchants. Also, there may be new merchant marketing opportunities for third party card issuers. One embodiment of the present invention includes the use of user age restrictions imposed on prepaid card issuance, such that the prepaid card can be used for adults-only e-commerce.

BRIEF DESCRIPTION OF THE DRAWINGS

All figures show functions and features in a preferred embodiment:

FIGS. 2-A and 2-B describe the operative flow between middleman and the e-commerce merchant.

FIG. 3 describes the operative flow between middleman and card issuers.

DESCRIPTION OF A PREFERRED EMBODIMENT

Figure 1:
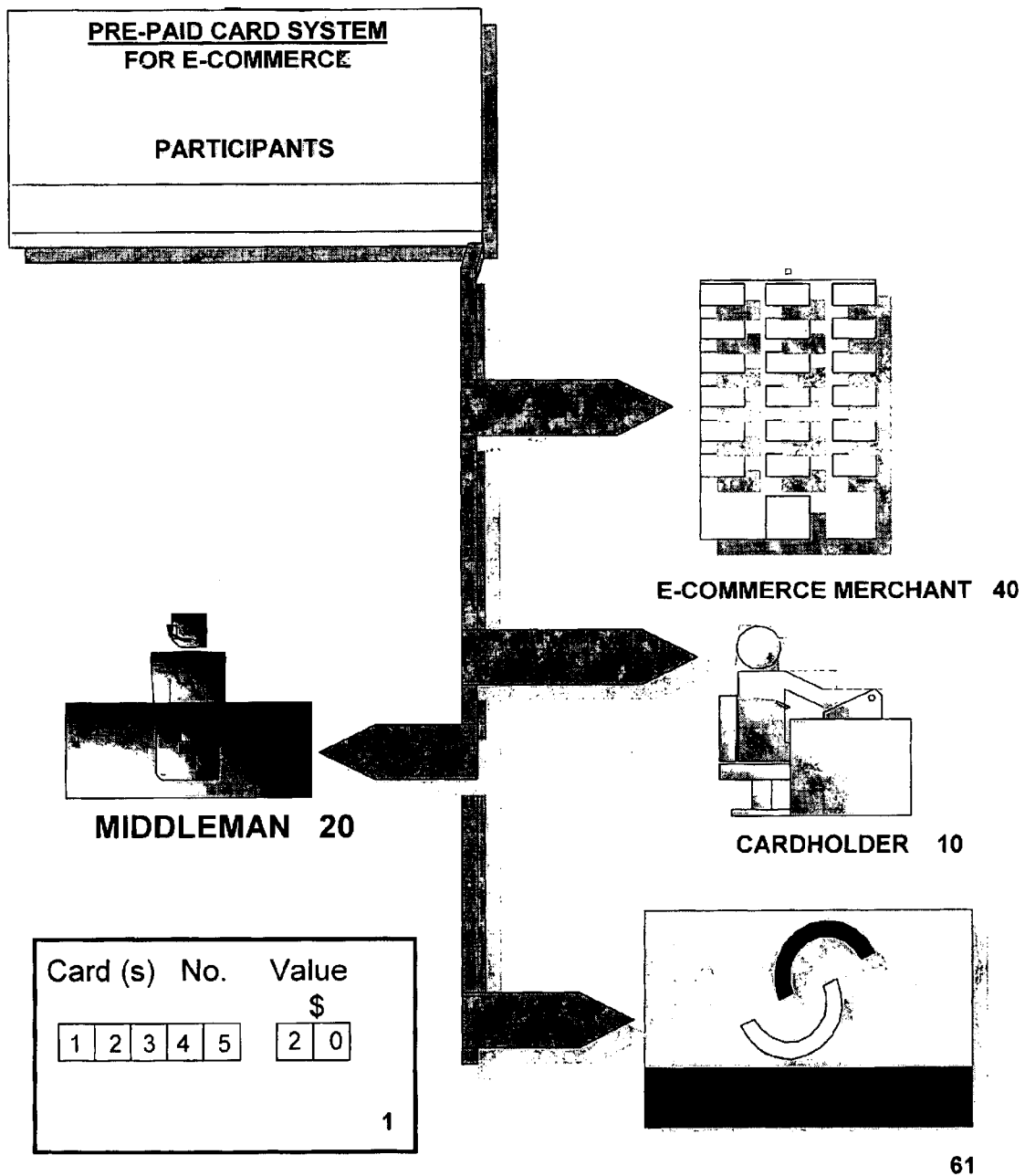
FIG. 1 describes the participants of the e-commerce business method with prepaid cards.

In a preferred embodiment, the present invention is a prepaid card system enabling customers to access payment-based Internet websites and make purchases of goods and services online.

System Components

The system includes seven (7) main functional components: (1) one or more prepaid cards bearing a predetermined stored value and authentication codes; (2) one or more cardholder computers communicating via the Internet with e-commerce merchant websites; (3) an intermediary or "middleman" secure host server communicating via an intranet with e-commerce merchants, prepaid card issuers, and said e-commerce merchant's banks; (4) one or more searchable databases hosted on the middleman secure host server storing participating e-commerce merchant registration information, including the e-commerce merchant's designated bank account information for depository payments, card issuer information or, if the middleman is also the card issuer, card value, card authorization codes and balance information; (5) one or more software applications hosted at the host computer of a private prepaid card issuer to interpret the data sent by the middleman secure host server for the identification and online deduction of the amount of value used in the particular transaction from the particular prepaid card; (6) one or more software applications hosted at the e-commerce merchant's Web server for reception and transmission of cardholder card data; and (7) one or more software applications hosted at the middleman secure host server for transaction accounting and e-commerce merchant payment processing between the e-commerce merchant, the card issuer, the middleman and the e-commerce merchant's bank. The system, in a preferred embodiment, also includes user age restrictions associated with the prepaid cards for use of said cards in electronic commerce transactions involving adults-only goods or services such that said prepaid cards are only issuable to adults. The user age restrictions are imposed at the time of purchase of the card. Such restricted cards bear restriction information such that the point of sale issuer cannot legally sell such cards to minors, and requires proof of age for issuance. The searchable databases in this embodiment also store prepaid card user age restriction information.

Cards

Each of the cards preferably includes a body portion and a read-only memory stripe having stored therein a security number or alternately a scratch-off portion which has an imprinted authorization code. The authorization code is preferably an alphanumeric character sequence rather than just numeric, providing for greater security and distinguishing from prepaid cards used for telephone applications, which typically have numeric codes. The card is typically formed of cardboard or plastic and may include the security number in clear text under a suitable blackout. The prepaid card may be used to purchase various goods and services up to the authorized dollar amount. The system prepaid cards are preferably sold at kiosks or terminals located at retail stores and other point-of-sale locations.

Cardholder Computer

Preferably, each cardholder computer includes means (such as a keypad) for entering any monetary amount corresponding to an amount of the transaction proposed to be completed by the cardholder, means (such as a modem) for accessing and communicating via the Internet with e-commerce merchant websites to transfer the cardholder password/security number, the requested payment authorization amount and means (such as a display) for receiving and displaying a verification message from the merchant server that the transaction has been approved.

Middleman Secure Host Server

Figure 10:
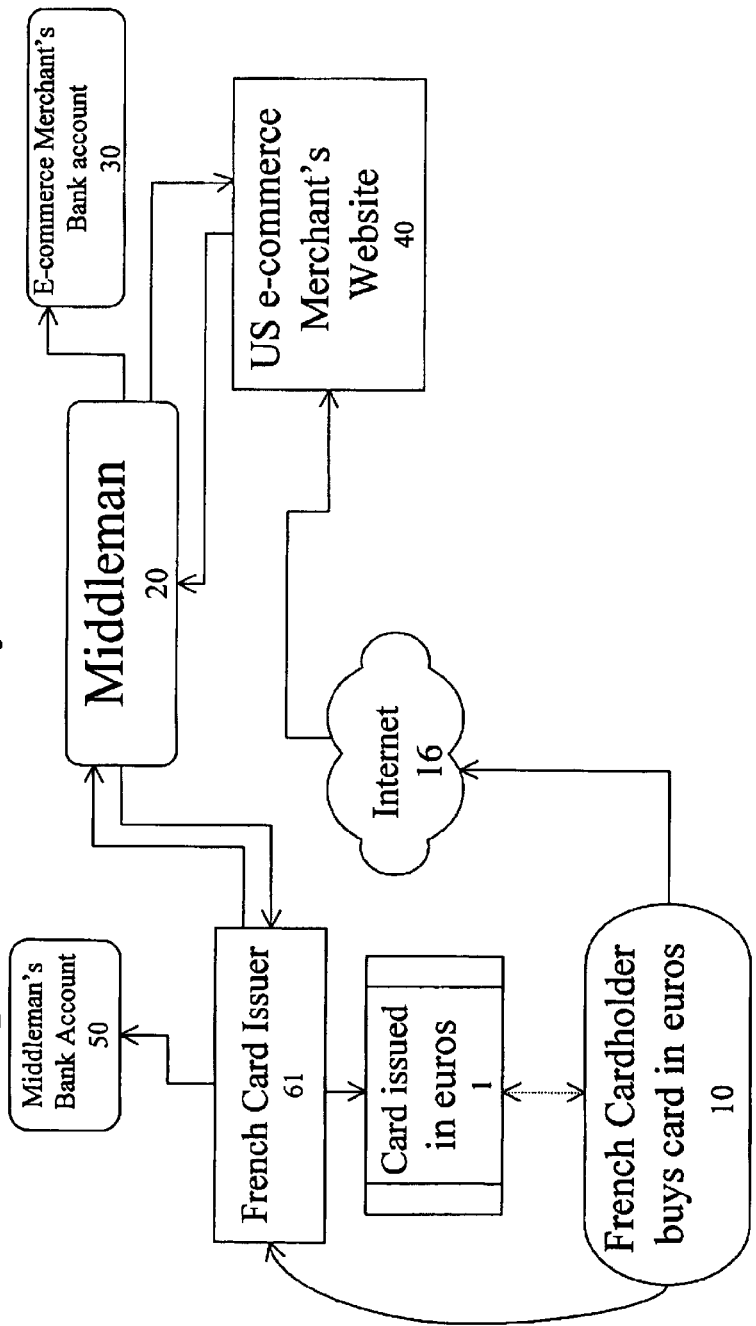
FIG. 10 describes the flow of multi-currency e-commerce transactions using the system and method of the present invention.

The main management and processing of the system is effected by the middleman secure host server, which communicates via the system intranet with e-commerce merchants and card issuers. The presence of a middleman to act as an intermediary and facilitate the transaction between e-commerce merchants, prepaid cardholders and prepaid card issuers and e-commerce merchant bank accounts enables multiple parties to engage in e-commerce by establishing one relationship (with the middleman). With a middleman, e-commerce merchant only signs one contract to be able to accept the system's prepaid cards as payment, and, thereby can accept the proprietary prepaid card as well as all other third party local and foreign prepaid cards supported through the system through the middleman's contracts with such card issuers. Through the middleman secure host server, multicurrency transactions can be completed as shown in FIG. 10 with the middleman performing currency conversion functions. Without the middleman's presence, each e-commerce merchant would deal with different card issuers and arrange contracts with each one of them. This would be much more complicated if card issuers were not within the same locality. The system provides to the e-commerce merchants a solution to their electronic payment problem, receiving their payments directly from the middleman.

The system utilizes known Internet communications protocols, links and hardware. Users of the system use and access the system through computer terminals or other Internet access devices connecting to the system through known methods of Internet connection and communication. The system, itself, however processes prepaid card transactions through a secure intranet.

Method

The invention is also directed to a method of making e-commerce payments using a prepaid card comprising the following steps: purchasing a prepaid card (either offered or supported by the system of the present invention) bearing a predetermined stored value and authentication codes; sending a transaction payment request, accompanied by said prepaid card's authentication codes to an e-commerce merchant's web server; transmitting said transaction payment request and said prepaid card's authentication codes from said e-commerce merchant's web server to a middleman secure host server communicating via an intranet with said e-commerce merchant's web server, prepaid card issuers and said e-commerce merchant's bank, for verification of said prepaid card's authorization and available value; transmitting said transaction payment request to the issuer of said prepaid card for approval or rejection; verifying said prepaid card's authentication and available value; approving or rejecting said transaction payment request; transmitting notification of approval or rejection from said prepaid card issuer to said middleman secure host server; if said transaction is approved, processing said transaction payment from said prepaid card issuer to said middleman secure host server; and processing said approved transaction payment from said middleman secure host server to said e-commerce merchant's bank account.

The present invention also provides a method for electronic commerce merchants to accept payment from customers in the form of a prepaid card bearing a predetermined value and authentication codes, comprising the following steps: registering via the Internet with a middleman secure host server that has an intranet established with one or more prepaid card issuers to process payment requests from and payments to e-commerce merchants using said prepaid card issuers' prepaid cards; receiving an e-commerce transaction payment request from a customer using a prepaid card issued by a card issuer with which said middleman secure host server has established said intranet said payment request including the stored value amount and authentication code information borne on said prepaid card; transmitting said e-commerce transaction payment request and prepaid card information to said middleman secure host server; transmitting said e-commerce transaction payment request and prepaid card information from said middleman secure host server to said prepaid card's issuer for verification and approval or rejection; approving or rejecting said e-commerce transaction payment request; transmitting notification of approval or rejection of said e-commerce transaction payment request from said prepaid card issuer to said middleman; processing approved e-commerce transaction payments from said prepaid card issuer to said middleman secure host server; and processing said approved e-commerce transaction payments from said middleman secure host server to said e-commerce merchant's bank account.

The system thereby provides a security function in that only to those cards authorized for use as payment for restricted goods/services can be used for such transactions.

Referring now to the drawings, there is illustrated an exemplary prepaid card system that enables customers to access an Internet website.

As seen in FIG. 1, each of the cards 1 alternately includes a body portion, a value amount and a security number. The card 1 is typically formed of cardboard, paper or plastic and may include the security number in cleartext under a suitable user-removable scratch-off or other material (such as an opaque tape). If desired, a smart card may be used to store the security number or other information, although preferably the system and method are implemented with so-called "dumb" or non-intelligent cards.

Figure 9:
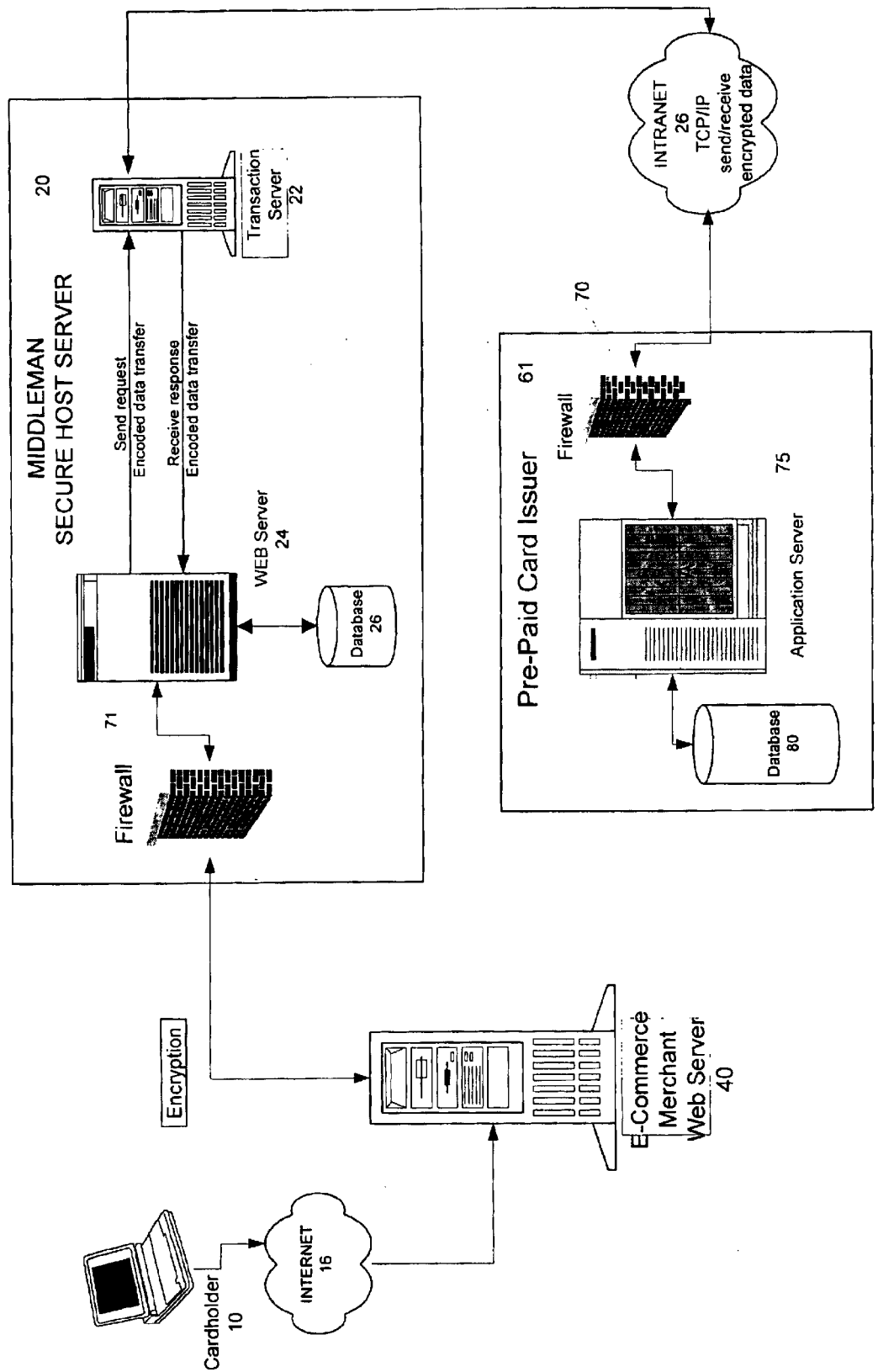
FIG. 9 is a block diagram of the system's secure intranet network.

Referring to FIG. 9, the main management and processing of the system is effected by the middleman secure host server, which is connected to the Internet 16. Although not meant to be limiting, preferably the middleman host server 20 comprises a general purpose personal computer with an Internet and intranet communications server 24 and a transaction server 22, one or more databases 26 and firewalls, as well as system software applications running a multi-tasking operating system such as Unix. Alternatively, the middleman host server computer 20 is implemented with any windows-based operating system. The middleman host server 20 has sufficient database storage means 26 associated therewith to enable records to be maintained for every authorized system proprietary prepaid card in the system. The middleman secure host server 20 also includes a modem for communicating with other system participants.

The e-commerce merchant server 40 includes, in a preferred embodiment means (such as a keypad) for entering prepaid card authorization information supplied by the cardholder 10 any monetary amount corresponding to a particular proposed e-commerce transaction, means (such as a modem) for connecting to the middleman secure host server 20 to receive the card 1 authentication codes and the requested payment authorization amount and means (such as a display) for receiving and displaying a verification message from the middleman secure host server 20 authorizing or rejecting the proposed payment amount. These particular input/output devices of the data terminal are merely exemplary, as other equivalent devices may also be used. For example, the keypad may be replaced or supplemented with a voice recognition card connected to a microphone for providing limited speaker-independent or speaker-dependent discrete or continuous voice recognition. The communications link need not be made over a telephone line, but may be wireless, fiber optic or include any other well-known means for establishing a communications link between two locations. The display itself may be aural as opposed to visual. Similarly, the term "Internet" includes the global computer network currently referred to as the Internet and other future global computer networks.

The operation of the system can now be described. In a preferred scenario, the cardholder 10 first accesses the desired e-commerce merchant's website 40. The cardholder enters proposed transaction information, selecting a system-supported prepaid card 1 as the method for payment and providing the authentication codes from the back of the card 1. If a card 1 is valid and usable, the transaction is completed and the system keeps track of the card value used as the transaction proceeds.

The middleman secure host server 20 contains sufficient database storage means 26 associated therewith to enable purchase records to be maintained for each system proprietary prepaid card 1 in the system. Preferably, each purchase record established in the system includes a number of pieces of information: the card security number, the identity of the e-commerce merchant at which the card was presented for payment, the point of sale location where the prepaid card was issued, the purchase balance of the card and transaction restrictions associated with each purchase.

Referring to FIG. 1, the participants in the system and method of the present invention are described: the middleman 20, the e-commerce merchant 40, the cardholder 10 and prepaid card issuer 61 which is either the system or a third party prepaid card issuer. The method of the present invention uses a 4-party protocol involving these parties. When a cardholder 10 is ready to buy something from an e-commerce merchant 40 on the Internet 16 using a prepaid card 1, the cardholder 10 sends a cardholder payment request through the cardholder's computer over the Internet to the e-commerce merchant's computer 40. The e-commerce merchant's computer forwards the cardholder's payment request over the Internet to the system's middleman secure host server 20. The middleman secure host server 20 passes the cardholder's payment request to the card issuer's 61 server over a private network path, to check whether the cardholder's card account is active and sufficient for the proposed transaction with the e-commerce merchant 40. The card issuer 61 authorizes or rejects the transaction in a message sent over private path to the middleman secure host server 20. The middleman secure host server 20 sends the transaction authorization or rejection to the e-commerce merchant 40 over the Internet or via the private intranet. Once the e-commerce merchant 40 has received the transaction authorization from the middleman secure host server 20, the e-commerce merchant completes the transaction with the cardholder 10. The e-commerce merchant 40 then sends a message over the system intranet path to the middleman secure host server 20 to capture the transaction and complete the payment process. The middleman secure host server 20 then sends payment and confirming message to the e-commerce merchant 40 with payment deposited in said e-commerce merchant's bank account.

FIGS. 2-A and 2-B describe the operative flow between middleman and e-commerce merchants is described. Two processes are detailed: first process is described in FIG. 2-A and involves the e-commerce merchant registration with the system to accept prepaid cards as payment, and the agreement the merchant is required to sign 41. In this agreement, the terms and conditions governing the use of the system are established. The merchant can then exhibit the names of the prepaid cards accepted on its sales formulary 45. The merchant can then also provide its bank name and account number where payments are to be deposited 42. Upon registration with the system, the e-commerce merchant obtains and installs on its computer system one or more system standard prepaid card payment transaction processing software applications 44. The agreement forms and the software needed are downloaded from middleman's web server.

The second process described in FIG. 2-B involves the transaction process flow. This includes the following steps: 1) The e-commerce merchant, after a prepaid card transaction payment request is made by a cardholder seeking to purchase goods or services from said merchant, informs middleman secure host server the prepaid card's number (which would become the identification code of the transaction), the issuer and the amount to be charged 400; 2) The middleman secure host server verifies online with the card issuer the prepaid card's authenticity 1200; 3) the card issuer rejects or accepts the prepaid card 1250; and 4) the middleman secure host server discounts agreed commissions and creates a credit account specific to said transaction in favor of the e-commerce merchant and transfers the net payment amount to the e-commerce merchant's bank account 1600. Single or batch payment processing can be done.

FIG. 3 describes the operative flow between the middleman secure host server and card issuers, which is the same as for the middleman's proprietary prepaid card as it is with third party card issuers. Two processes are detailed: The first involves the agreement between the prepaid card issuers and the middleman, where the appropriate terms of their relationship and payment transaction processing are detailed 1210. Also through the agreement, the card issuer receives middleman's bank's name and account number where the payments are to be deposited 1220. Also, conditions of use can be established for the card issuer to interpret the information coming from the middleman secure host server 1230.

The second process, involves the transaction process flow between the middleman and third party card issuers: 1) the middleman secure host server sends the card identification code number and proposed payment amount 1100; 2) the card issuer verifies the card's authenticity 1200; 3) approves or rejects the transaction 1250; 4) if approved, the card issuer transfers the payment funds to middleman's bank account, discounting the agreed commission 1600; and 5) the card issuer reduces the card's value and updates it 1400.

Figure 4:
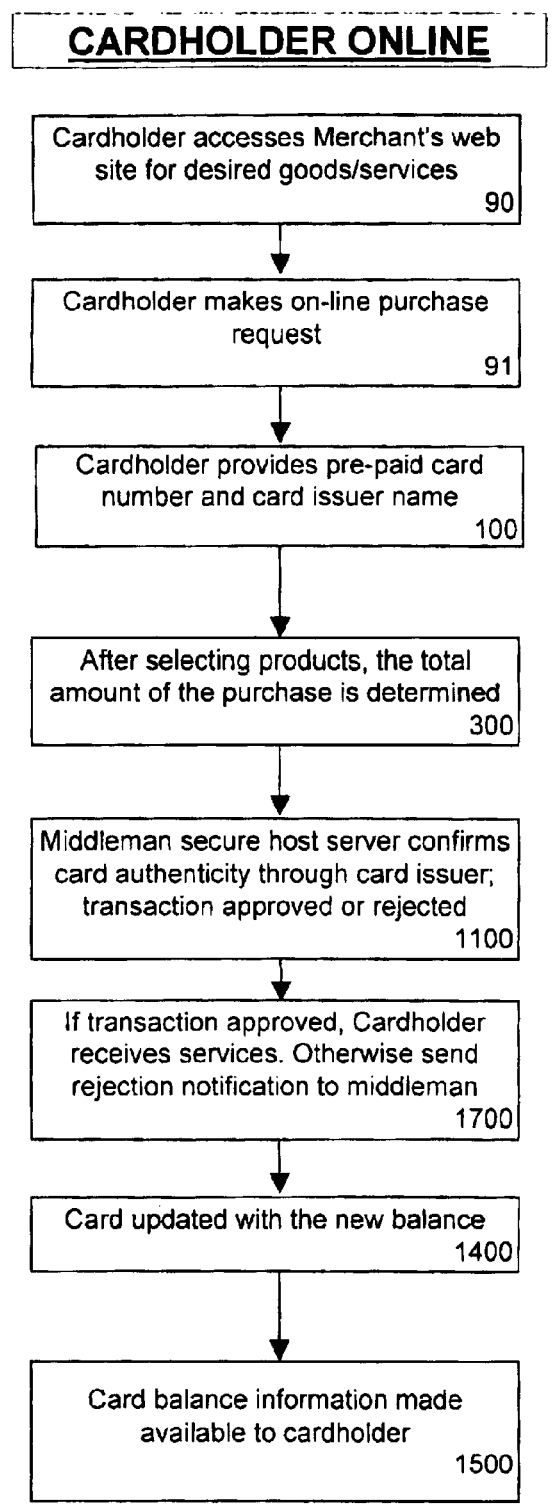
FIG. 4 describes the cardholder's participation.

FIG. 4 describes the cardholder's participation in the transaction flow: 1) the cardholder accesses the desired e-commerce merchant's to purchase desires web site goods or services 90; 2) the cardholder fills out the merchant's the on-line buying form 91, enters the prepaid card number and the card issuer name or code 100; 3) after choosing the goods or services, the total amount of the card transaction is determined 300; 4) once the middleman secure host server confirms the authenticity and payment authorization for the card 1100, the cardholder is able to receive the goods and/or services 1700; 5) the card is updated with the new balance 1400; and 6) the cardholder can consult on-line his card balance at the middleman's web site or directly by telephone to the card issuer, as applicable 1500. The middleman secure host server 20 checks the database for the data associated with the codes and notifies the e-commerce merchant 40 if a sufficient balance is present to make the desired purchase. If a sufficient balance is not available, the middleman secure host server 20 issues a rejection message. If a sufficient balance is present, the middleman secure host server 20 deducts the entered purchase amount from the card's balance and associates a transaction code with the purchase. The e-commerce merchant then completes the transaction with the cardholder 10. Upon completion of the transaction, the cardholder 10 is provided with information as to the remaining balance on the card 1.

Figure 5:
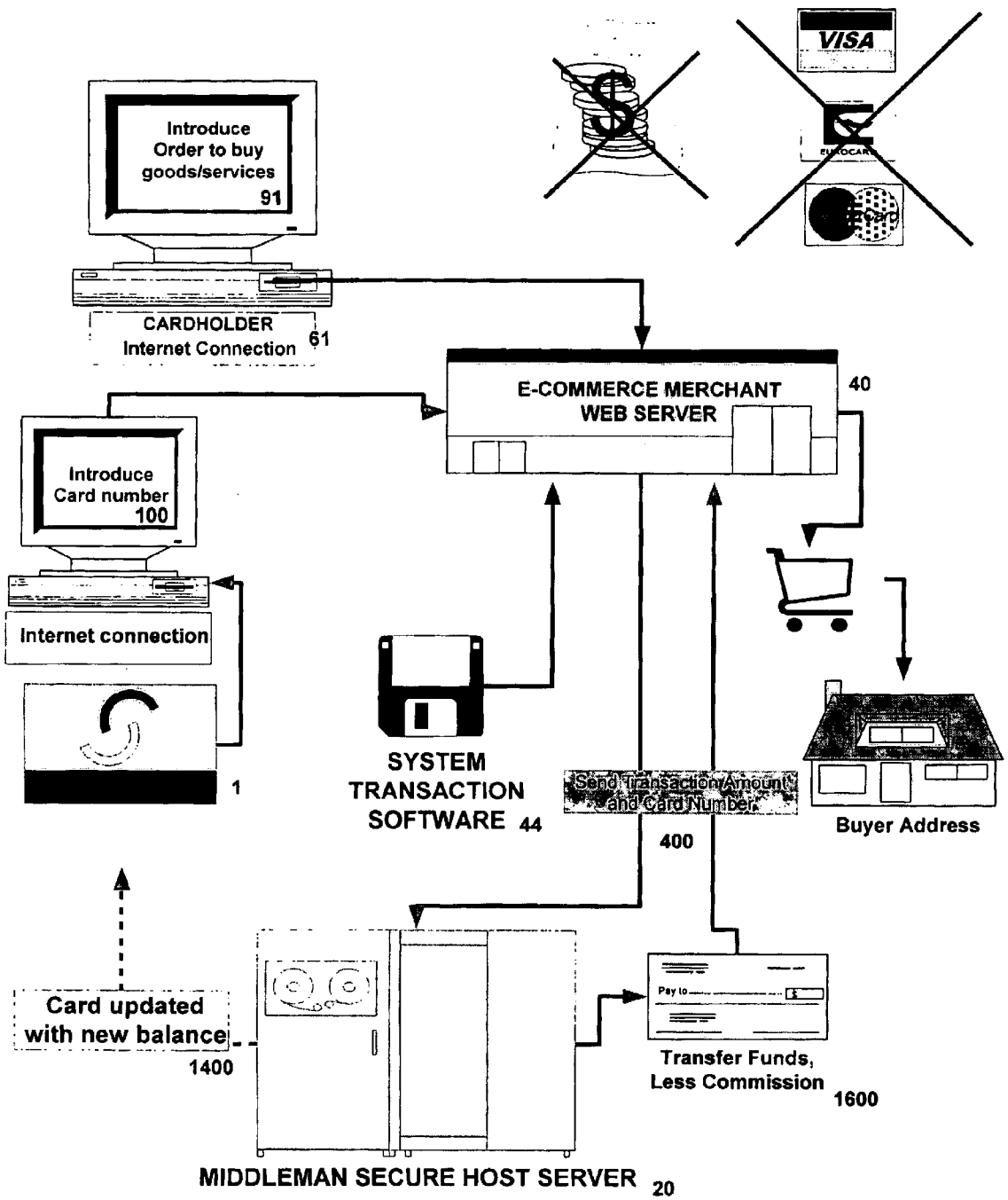
FIG. 5 describes the operative flow of an e-commerce transaction using the system and method of the present invention with a proprietary prepaid card.

FIG. 5 describes the flow of a transaction using the proprietary prepaid card payment system and method. The cardholder enters the e-commerce merchant's web server 40 via the Internet and after choosing buying options, enters the prepaid card number. The secure software 44 installed at the e-commerce merchant's web server 40 informs the middleman if the card number and transaction amount are authorized. The middleman secure host server 20, after identifying and validating the card, discounts the amount used from the card and completes the relevant funds transfer from the card issuer to the e-commerce merchant's designated bank account.

Figure 6:
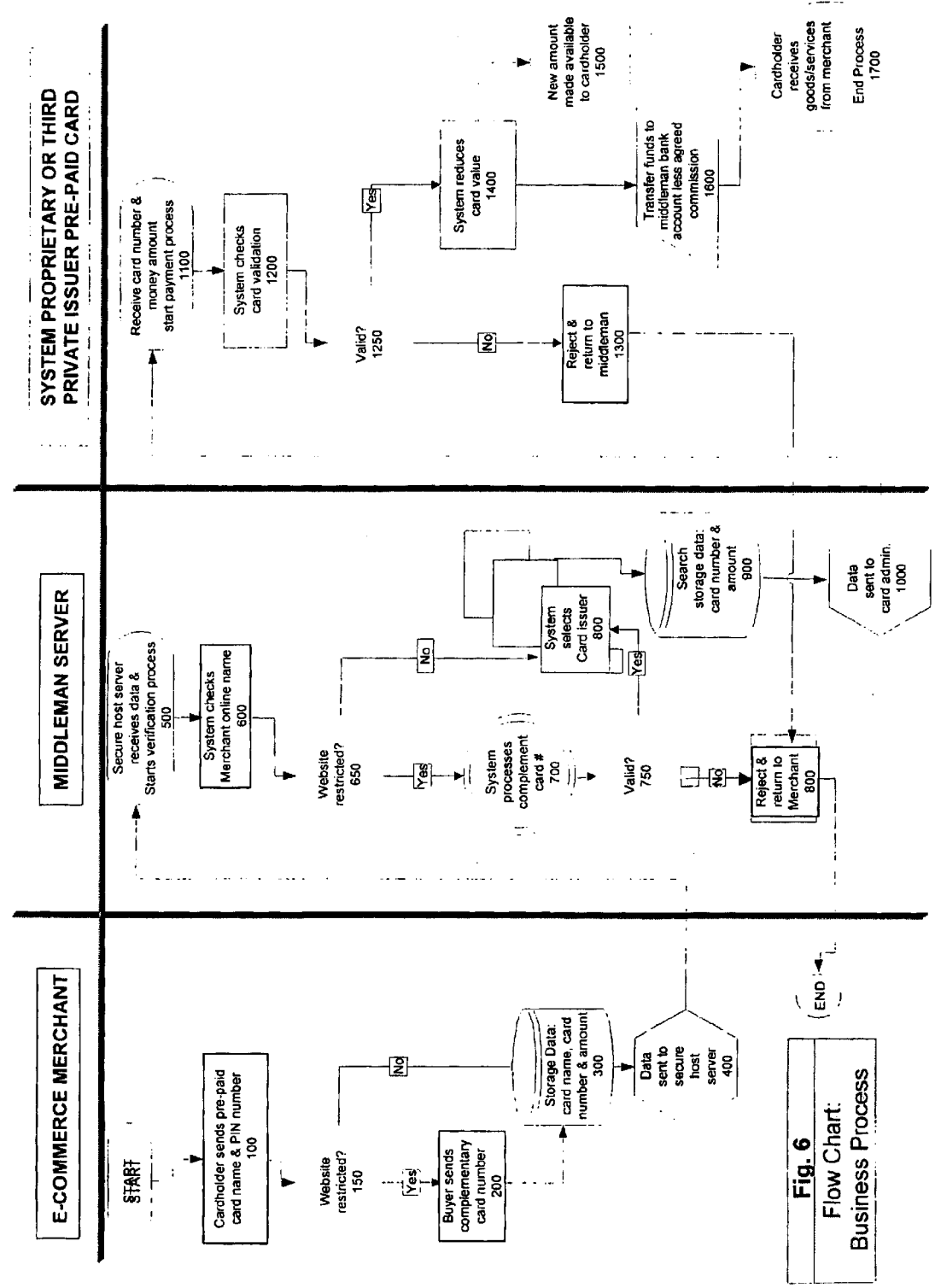
FIG. 6 is a flow chart of the business process flow of the method of the present invention.
Figure 7:
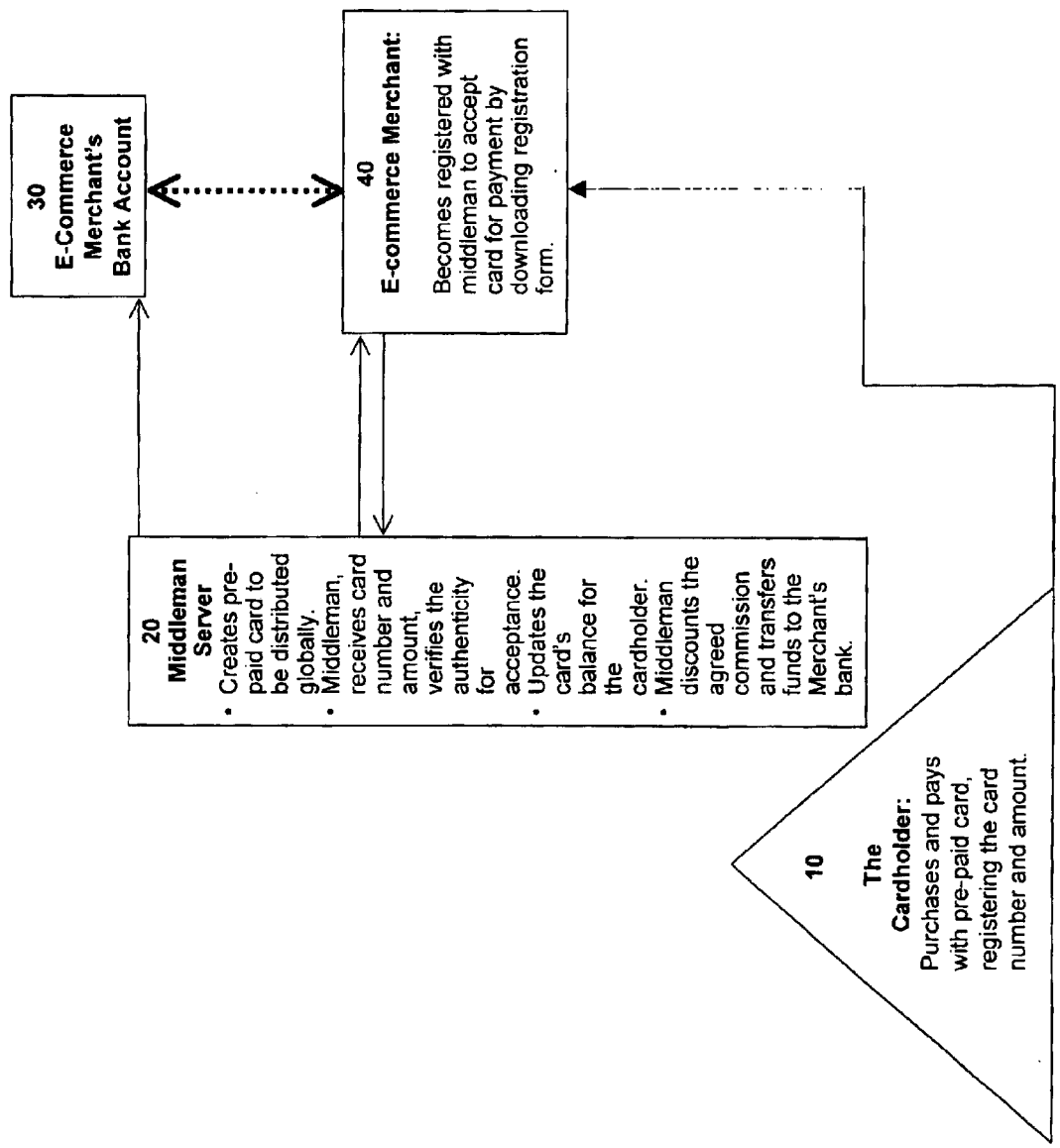
FIG. 7 describes the flow of transactions with the e-commerce merchant using the system and method of the present invention.
Figure 8:
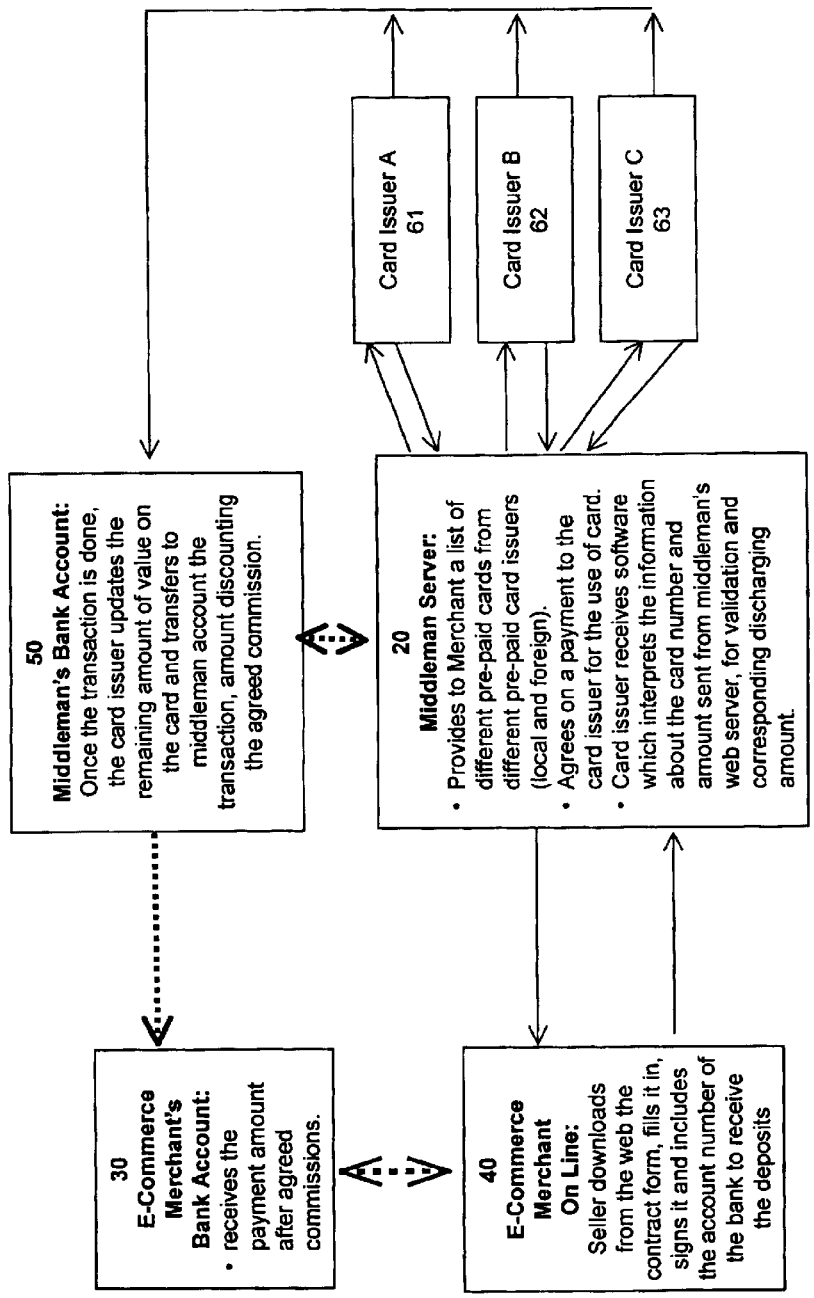
FIG. 8 describes the relationship between card issuers, e-commerce merchants and the middleman, in case of use of prepaid cards issued by third party issuers.

FIG. 6 depicts a flow chart with the different computing processes involved in the typical e-commerce transaction using the system and method of the present invention. The process starts with the access of the cardholder to the e-commerce merchant's web site and entering the prepaid card number and the card issuer's name as the form of payment 100. The middleman secure host server processes the information as shown in steps 150–1700, and finally discounts from the card value and makes payment. FIG. 7 shows the business method implementation of the present invention. On FIG. 8, the flow of an e-commerce transaction is described using the prepaid cards issued by third party prepaid card issuers.

FIG. 9 describes the security network where system online operates, as well with the data transmission as with the own processes. The system intranet guarantees the most security and trustfulness of service.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative and other embodiments may be selected without departing from the spirit and scope of the present invention.

What is claimed is:

1. A prepaid card payment system for electronic commerce, comprising:

one or more prepaid cards bearing a predetermined stored value and authentication codes;

one or more cardholder computers communicating via the Internet with e-commerce merchant websites;

an intermediary or "middleman" secure host server communicating via an intranet with e-commerce merchants, prepaid card issuers and said e-commerce merchant's banks providing a single point of contact for e-commerce merchants to process e-commerce transactions involving prepaid cards issued by multiple card issuers which collects payment in e-commerce transactions as authorized payee from said prepaid card issuers and then makes payment to an e-commerce merchant bank account designated by the merchant involved in said e-commerce transaction;

one or more searchable databases hosted on said middleman secure host server storing participating e-commerce merchant registration information and card issuer information;

one or more software applications hosted at the host computer of said prepaid card issuer to interpret the data sent by said middleman secure host server for the identification and online deduction of the amount of value used in the particular transaction from said prepaid card;

one or more software applications hosted at said e-commerce merchant's web server for reception and transmission of said cardholder data; and one or more software applications hosted at said middleman secure host server for transaction accounting and e-commerce merchant payment processing between said e-commerce merchant, said card issuer, said middleman secure host server and said e-commerce merchant's bank.

2. The prepaid card payment system of claim 1 wherein said prepaid cards additionally have associated with them user age restrictions for use of said cards in electronic commerce transactions involving adults-only goods or services, such that said prepaid cards are only issuable to adults, and said one or more searchable databases also store prepaid card user age restriction information.

3. The prepaid payment system of claim 1, wherein said prepaid cards' authentication codes are in the form of an alphanumeric character sequence.

4. The prepaid card payment system of claim 1, wherein said middleman secure host server is also a prepaid card issuer and said one or more searchable databases also store prepaid value, authorization code and balance information.

5. The prepaid card system of claim 1, wherein said one or more software applications hosted at said middleman secure host server further comprise one or more currency conversion software applications for performing e-commerce transactions involving multiple currencies.

6. A prepaid card method for electronic commerce, comprising the following steps:
purchasing a prepaid card bearing a predetermined stored value and authentication codes;
sending a transaction payment request accompanied by said prepaid card's authentication codes to an e-commerce merchant's web server;
transmitting said transaction request and said prepaid card's authentication codes from said e-commerce merchant's web server to a middleman secure host server for verification of said prepaid card's authorization and available value;
transmitting said transaction payment request to the issuer of said prepaid card for approval or rejection;
approving or rejecting said transaction payment request;
transmitting notification of approval or rejection from said prepaid card issuer to said middleman secure host server;
processing approved transaction payments from said prepaid card issuer to said middleman secure host server as authorized payee;
processing said approved transaction payments from said middleman secure host server to said e-commerce merchant's bank account.

7. The method of claim 6, wherein said prepaid card has associated with it user age restrictions signifying whether or not said prepaid card can be used in electronic commerce transactions involving adults-only goods and services, and further comprising the step of verifying when said prepaid card is presented for payment, whether said card is authorized for use based on said user age restrictions.

8. The method of claim 6, wherein said prepaid cards' authentication codes are in the form of an alphanumeric character sequence.

9. The method of claim 6, further comprising the step of deducting a commission agreed upon between said card issuer and said middleman secure host server when processing said transaction approved payment from said prepaid card issuer to said middleman secure host server.

10. The method of claim 6, further comprising the step of deducting a commission agreed upon between said middleman secure host server and said e-commerce merchant when processing said transaction payment from said middleman secure host server to said e-commerce merchant's bank account.

11. A method for electronic commerce merchants to accept payment from customers in the form of a prepaid card bearing a predetermined value and authentication codes, comprising the following steps:
registering via the Internet with a middleman secure host server that has an intranet established with one or more prepaid card issuers to process payment requests from and payments to e-commerce merchants using said prepaid card issuers' prepaid cards;
receiving an e-commerce transaction payment request from a customer using a prepaid card issued by a card issuer with which said middleman secure host server has established said intranet said payment request including the stored value amount and authentication code information borne on said prepaid card;
transmitting said e-commerce transaction payment request and prepaid card information to said middleman secure host server;
transmitting said e-commerce transaction payment request and prepaid card information from said middleman secure host server to said prepaid card's issuer for verification and approval or rejection;
approving or rejecting said e-commerce transaction payment request;
transmitting notification of approval or rejection of said e-commerce transaction payment request from said prepaid card issuer to said middleman;
processing approved e-commerce transaction payments from said prepaid card issuer to said middleman secure host server; and
processing said approved e-commerce transaction payments from said middleman secure host server to said e-commerce merchant's bank account.

12. The method of claim 11, wherein said e-commerce transaction payment request and prepaid card information also includes prepaid card user age restriction information signifying whether or not said prepaid card can be used for payment in electronic commerce transactions involving adults-only goods or services, and further comprising the step of verifying, when said prepaid card is presented for payment, whether said card is authorized for use in said transaction based on said user age restrictions.

13. The method of claim 11, further comprising the step of deducting a commission agreed upon between said card issuer and said middleman secure host server when processing said e-commerce transaction payment from said prepaid card issuer to said middleman secure host server.

14. The method of claim 11, further comprising the step of deducting a commission agreed upon between said middleman and said e-commerce merchant when processing said e-commerce transaction payment from said middleman secure host server to said e-commerce merchant's bank account.

* * * * *